United States Patent
Kang et al.

(10) Patent No.: US 7,904,704 B2
(45) Date of Patent: Mar. 8, 2011

(54) INSTRUCTION DISPATCHING METHOD AND APPARATUS

(75) Inventors: Jack Kang, Sunnyvale, CA (US); Yu-Chi Chuang, Jhubei (TW)

(73) Assignee: Marvell World Trade Ltd., St. Michael (BB)

( * ) Notice: Subject to any disclaimer, the term of this patent is extended or adjusted under 35 U.S.C. 154(b) by 392 days.

(21) Appl. No.: 11/833,099

(22) Filed: Aug. 2, 2007

(65) Prior Publication Data

US 2008/0040724 A1   Feb. 14, 2008

Related U.S. Application Data

(60) Provisional application No. 60/822,326, filed on Aug. 14, 2006.

(51) Int. Cl.
G06F 9/00 (2006.01)

(52) U.S. Cl. .............................. 712/229; 712/43; 712/228

(58) Field of Classification Search .................... 712/43, 712/228, 229
See application file for complete search history.

(56) References Cited

U.S. PATENT DOCUMENTS

| | | | | |
|---|---|---|---|---|
| 5,964,843 | A * | 10/1999 | Eisler et al. | 719/323 |
| 5,966,543 | A * | 10/1999 | Hartner et al. | 710/200 |
| 7,212,155 | B2 * | 5/2007 | Hatch et al. | 342/357.12 |
| 7,334,086 | B2 * | 2/2008 | Hass et al. | 711/123 |
| 7,340,742 | B2 * | 3/2008 | Tabuchi | 718/103 |
| 7,346,757 | B2 * | 3/2008 | Hass et al. | 711/207 |
| 7,461,213 | B2 * | 12/2008 | Hass et al. | 711/147 |
| 7,461,215 | B2 * | 12/2008 | Hass | 711/154 |
| 7,467,243 | B2 * | 12/2008 | Rashid et al. | 710/52 |
| 7,509,462 | B2 * | 3/2009 | Hass et al. | 711/148 |
| 7,562,362 | B1 * | 7/2009 | Paquette et al. | 718/102 |
| 7,627,721 | B2 * | 12/2009 | Hass | 711/148 |
| 2002/0194249 | A1 * | 12/2002 | Hsieh | 709/103 |
| 2002/0194250 | A1 * | 12/2002 | Hsieh | 709/103 |
| 2003/0037117 | A1 * | 2/2003 | Tabuchi | 709/207 |
| 2004/0148606 | A1 | 7/2004 | Hosoe | |
| 2004/0215947 | A1 | 10/2004 | Ward, III et al. | |
| 2005/0027793 | A1 * | 2/2005 | Hass | 709/200 |
| 2005/0033831 | A1 * | 2/2005 | Rashid | 709/220 |
| 2005/0033832 | A1 * | 2/2005 | Hass et al. | 709/220 |
| 2005/0033889 | A1 * | 2/2005 | Hass et al. | 710/260 |
| 2005/0041651 | A1 * | 2/2005 | Hass et al. | 370/360 |
| 2005/0041666 | A1 * | 2/2005 | Hass | 370/394 |
| 2005/0044308 | A1 * | 2/2005 | Rashid et al. | 711/112 |
| 2005/0044323 | A1 * | 2/2005 | Hass | 711/122 |
| 2005/0044324 | A1 * | 2/2005 | Rashid et al. | 711/122 |

(Continued)

OTHER PUBLICATIONS

Eggers, Susan J.; Emer, Joel S.; Levy, Henry M.; Lo, Jack L.; Stamm, Rebecca L.; Tullsen, Dean M. "Simultaneous Multithreading: A Platform for Next-Generation Processors". IEEE Micro. © Sep./Oct. 1997. pp. 12-19.*

(Continued)

Primary Examiner — Aimee J Li

(57) ABSTRACT

A system, apparatus and method for instruction dispatch on a multi-thread processing device are described herein. The instruction dispatching method includes, in an instruction execution period having a plurality of execution cycles, successively fetching and issuing an instruction for each of a plurality of instruction execution threads according to an allocation of execution cycles of the instruction execution period among the plurality of instruction execution threads. Remaining execution cycles are subsequently used to successively fetch and issue another instruction for each of the plurality of instruction execution threads having at least one remaining allocated execution cycle of the instruction execution period. Other embodiments may be described and claimed.

15 Claims, 9 Drawing Sheets

U.S. PATENT DOCUMENTS

| | | | |
|---|---|---|---|
| 2005/0055502 A1* | 3/2005 | Hass et al. | 711/122 |
| 2005/0055503 A1* | 3/2005 | Hass | 711/122 |
| 2005/0055504 A1* | 3/2005 | Hass et al. | 711/122 |
| 2005/0055510 A1* | 3/2005 | Hass et al. | 711/133 |
| 2005/0055540 A1* | 3/2005 | Hass et al. | 712/214 |
| 2005/0086361 A1* | 4/2005 | Rashid et al. | 709/233 |
| 2005/0108711 A1* | 5/2005 | Arnold et al. | 718/100 |
| 2005/0149936 A1* | 7/2005 | Pilkington | 718/102 |
| 2006/0056290 A1* | 3/2006 | Hass | 370/229 |
| 2006/0146864 A1* | 7/2006 | Rosenbluth et al. | 370/458 |
| 2006/0149927 A1* | 7/2006 | Dagan et al. | 712/43 |
| 2006/0179281 A1* | 8/2006 | Jensen et al. | 712/214 |
| 2006/0206692 A1* | 9/2006 | Jensen | 712/215 |

OTHER PUBLICATIONS

Eggers, Susan J.; Levy, Henry M.; Lo, Jack L.; Tullsen, Dean M. "Supporting Fine-Grained Synchronization on a Simultaneous Multithreading Processor". © Jan. 1999. IEEE. Proceedings of Fifth International Symposium on High-Performance Computer Architecture, 1999 pp. 54-58.*

* cited by examiner

| | IF | ID | IS | EX | MEM | WB |
|---|---|---|---|---|---|---|
| Cycle 1 | T0 | T? | T? | T? | T? | T? |
| Cycle 2 | T1 | T0 | T? | T? | T? | T? |
| Cycle 3 | T2 | T1 | T0 | T? | T? | T? |
| Cycle 4 | T0 | T2 | T1 | T0 | T? | T? |
| Cycle 5 | T1 | T0 | T2 | T1 | T0 | T? |
| Cycle 6 | T2 | T1 | T0 | T2 | T1 | T0 |
| Cycle 7 | T0 | T2 | T1 | T0 | T2 | T1 |
| Cycle 8 | T1 | T0 | T2 | T1 | T0 | T2 |
| Cycle 9 | T2 | T1 | T0 | T2 | T1 | T0 |
| | 310 | 320 | 330 | 340 | 350 | 360 |

| | IF 510 | ID 520 | IS 530 | EX 540 | MEM 550 | WB 560 |
|---|---|---|---|---|---|---|
| Cycle 1 | T0 | T? | T? | T? | T? | T? |
| Cycle 2 | T1 | T0 | T? | T? | T? | T? |
| Cycle 3 | T2 | T1 | T0 | T? | T? | T? |
| Cycle 4 | T3 | T2 | T1 | T0 | T? | T? |
| Cycle 5 | T4 | T3 | T2 | T1 | T0 | T? |
| Cycle 6 | T1 | T4 | T3 | T2 | T1 | T0 |
| Cycle 7 | T3 | T1 | T4 | T3 | T2 | T1 |
| Cycle 8 | T1 | T3 | T1 | T4 | T3 | T2 |
| Cycle 9 | T3 | T1 | T3 | T1 | T4 | T3 |
| Cycle 10 | T3 | T3 | T1 | T3 | T1 | T4 |

*500*

INSTRUCTION DISPATCHING METHOD AND APPARATUS

CROSS-REFERENCES TO RELATED APPLICATIONS

This application claims priority to provisional application 60/822,326, filed Aug. 14, 2006, entitled "Fine Grained Distributed Round Robin Scheduling", the contents of which are hereby incorporated by reference in their entirety for all purposes.

TECHNICAL FIELD

Embodiments of the present invention relate to the field of data processing, in particular, to techniques for dispatching instructions of multiple instruction execution threads in an instruction execution period having a plurality of execution cycles.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multi-thread processing by employing an operating system to manage hardware resource usage and thread switching. However, a significant performance penalty is incurred each time the processor changes threads. Additional inefficiency occurs in a single pipeline processor when a thread is initially allocated a block of execution cycles, but is unable to execute consecutive instructions as scheduled because necessary component data is unavailable.

SUMMARY OF THE INVENTION

In view of the problems in the state of the art, embodiments of the invention are based on the technical problem of optimizing successive instruction dispatching of multiple instruction threads during an instruction execution period having a plurality of execution cycles, and methods for such successive instruction dispatching. A processing system is also described, suitable to solve the problems which at least one embodiment of the invention is based on, with an execution block to execute instructions and an instruction dispatch block to successively fetch and issue instructions of the various instruction execution threads according to an allocation of execution cycles of an instruction execution period among the plurality of instruction execution threads, one instruction at a time from each instruction execution thread having remaining allocated execution cycles of the instruction execution period. In one embodiment, the processor includes a different program counter associated with each instruction execution thread to facilitate thread switching.

More specifically, with the foregoing and other items in view, there is provided, in accordance with various embodiments of the invention, a method for dispatching instructions including, in an instruction execution period having a plurality of execution cycles, successively fetching and issuing an instruction for each of a plurality of instruction execution threads according to an allocation of execution cycles of the instruction execution period among the plurality of instruction execution threads and subsequently successively fetching and issuing another instruction for each of the plurality of instruction execution threads that still have at least one remaining allocated execution cycle of the instruction execution period.

In accordance with a further mode of one embodiment of the invention, the successively fetching and issuing includes sequentially retrieving and issuing a next instruction for each instruction execution thread.

In accordance with an added mode of one embodiment of the invention, the successive fetching and issuing of instructions is based upon a weighted round robin scheme.

In accordance with another mode of one embodiment of the invention, the weighted round robin scheme allows for skipping an instruction execution thread when that instruction execution thread is waiting for data.

In accordance with an additional mode of one embodiment of the invention, the method for dispatching instructions further includes determining the execution cycle allocation for the instruction execution period for each of the plurality of instruction execution threads.

With various embodiments of the invention in view, there is also provided a processing device including an execution block to execute instructions and an instruction dispatch block, coupled to the execution block, to at least successively fetch and issue instructions of a plurality of instruction execution threads for execution by the execution block, one instruction at a time from each instruction execution thread having remaining allocated execution cycles of an instruction execution period, each instruction execution thread having one or more allocated execution cycles of an instruction execution period. In one embodiment, the execution block includes at least one execution means, such as a processing core co-disposed in an integrated circuit package with the instruction dispatcher. In one embodiment, the instruction dispatch block may include at least one instruction dispatch means, such as an instruction unit responsible for ensuring that instructions are properly decoded, fetched, queued, and dispatched for execution. Besides containing control circuitry for performing these functions, the instruction dispatch means may also include a storage means, such as an instruction cache and/or a data cache, to allow instructions and/or data of each thread to be fetched as a batch and executed sequentially, thereby avoiding latencies that would traditionally be encountered were each instruction to be retrieved from memory individually. In one embodiment, the instruction cache and/or data cache may include a multi-level cache configuration.

In accordance with another feature of at least one embodiment of the invention, there is provided a scheduler, coupled to the instruction dispatch block, to control the successive fetching and issuing of instructions by the instruction dispatch block. In accordance with an additional feature of at least one embodiment of the invention, the instruction dispatch block is adapted to sequentially retrieve and issue a next instruction from an instruction cache for each instruction execution thread having remaining allocated execution cycles each time the instruction dispatch block is signaled by the scheduler to dispatch instructions for the selected one of the plurality of instruction execution threads.

In accordance with again an additional feature of at least one embodiment of the invention, the processing device is a processor. In accordance with still a further feature of at least one embodiment of the invention, the processing device is an embedded processor. In accordance with a concomitant feature of the invention, the processing device is an integrated circuit.

Other features that are considered as characteristic for embodiments of the invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which:

FIG. 3 illustrates a chronological processing stage progression following a thread switch with equal bandwidth allocation as presented in FIG. 2, in accordance with various embodiments;

FIG. 5 illustrates a chronological processing stage progression following multiple thread switches with dynamic bandwidth allocation as presented in FIG. 4, in accordance with various embodiments;

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification may, but do not necessarily all refer to the same embodiment. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
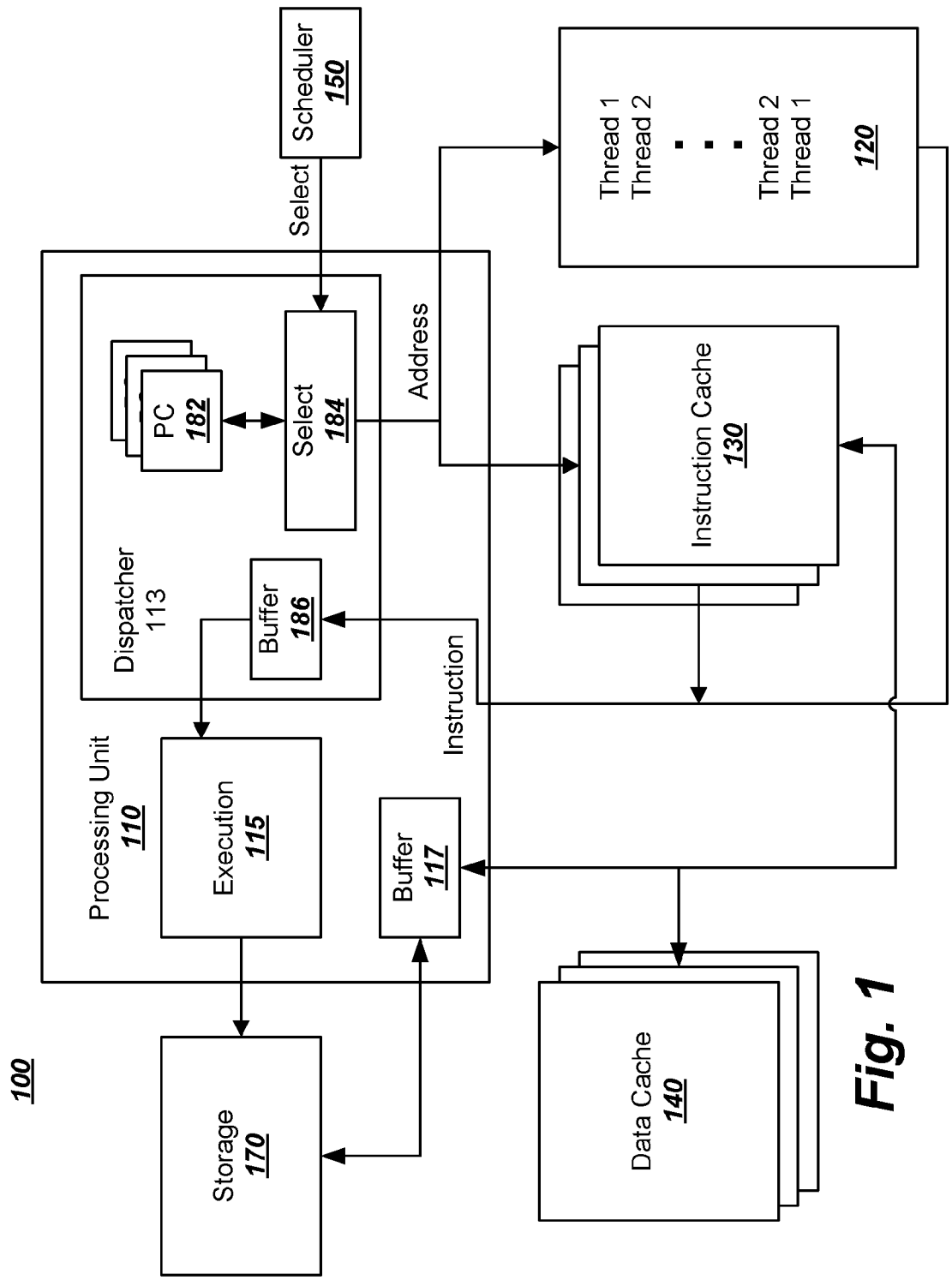
FIG. 1 illustrates a block diagram of an exemplary multi-thread processing environment in accordance with at least one embodiment.

Referring to FIG. 1, a block diagram shows an exemplary multi-thread processing environment 100 having a multi-thread processing core 110 with an instruction dispatcher 113, an execution circuitry 115, and a buffer 117 that are coupled to each other at least as shown. An embodiment illustrating a portion of the operations associated with the processing environment 100 are presented in FIG. 9 in further detail. In alternate embodiments, the present invention may be practiced with other processing environments 100.

In one embodiment, the instruction dispatcher 113 is configured to successively fetch and issue instructions from multiple instruction execution threads. Such a configuration may improve the performance (e.g., per area/power) for a system running multiple tasks simultaneously. More specifically, successively fetching and issuing instructions from multiple interleaved instruction execution threads reduces the effect of various data processing delays on the threads. For example, when the instruction dispatcher 113 successively fetches and issues an instruction from a thread that has either a load delay and/or branch delay, which would normally prevent data from being available to the thread for a brief period, the instruction may already be resolved when the instruction dispatcher 113 returns to the thread to fetch and issue the next instruction.

In one embodiment, the instruction dispatcher 113, during the course of an instruction execution period having multiple execution cycles, successively fetches and issues instructions, one instruction at a time from each instruction execution thread having remaining allocated execution cycles in the period, for execution by the execution circuitry 115. An instruction execution period is generally defined as having a certain number of execution cycles. Thus, for example, an instruction execution period may be defined as having 10 execution cycles.

In various embodiments, the instruction dispatcher 113 provides for thread switch when changing between instruction execution threads. As such, an instruction from a second thread may be executed immediately after an instruction from a first thread, such that the respective instructions are executed on subsequent cycles. In various embodiments, each thread is assigned at least one execution cycle per instruction execution period. In one embodiment, threads allocated a larger portion of the available bandwidth during the instruction execution period are also allocated extra execution cycles. The instruction dispatcher 113 successively dispatches instructions one instruction at a time from each instruction execution thread having remaining allocated execution cycles of the instruction execution period. In one embodiment, the instruction dispatcher 113 applies a distributed round robin scheduling scheme to each of the threads having remaining allocated execution cycles.

In one embodiment, the instruction dispatcher 113 is coupled to the execution circuitry 115, via a buffer 186, and includes at least one program counter 182 for each instruction execution thread to interleave the threads and to switch the processing core 110 between threads by switching which program counter provides the next instruction. Interleaving fetching and issuance of instructions from multiple currently executed threads using associated program counters is the subject matter of co-pending U.S. patent application Ser. No. 11/775,152, entitled "A Multi-Thread Processor with Multiple Program Counters", filed Jul. 9, 2007, the contents of which are hereby incorporated in their entirety for all purposes. Embodiments illustrating a portion of the operations associated with the dispatcher 113 are presented in FIG. 7 and FIG. 9 in further detail. In alternate embodiments, the present invention may be practiced with other dispatchers.

The multi-thread processing environment 100 also illustrates various closely associated system devices, which are coupled to the processing core 110 including tightly coupled memory 120, an instruction cache 130, a data cache 140, a scheduler 150, a storage 170. In various embodiments, the tightly coupled memory 120 is a smaller, faster memory than storage 170 and is generally configured to store a subset of instructions for at least one thread. As shown in FIG. 1, the tightly coupled memory 120 may be shared, in various embodiments, by the multiple threads, with or without partitioning for the various threads. In one embodiment, the tightly coupled memory 120 is used in conjunction with an embedded processor.

In various embodiments, the tightly coupled memory 120 may functionally operate as an L1 cache by providing faster response time than the instruction cache 130 or storage 170. Accordingly, when a requested thread address is found in the tightly coupled memory 120, the instruction associated with the address may not need to be retrieved from the instruction cache 130 or storage 170. In one embodiment, a tightly coupled memory 120 is configured to store at least a first and a second corresponding subset of instructions of first and second instruction threads.

An instruction cache 130 may store additional instructions associated with a thread. In a multi-thread environment, one embodiment dynamically allocates a portion of the instruction cache to each thread. Accordingly, in one embodiment the instruction cache 130 is configured to store at least a first and a second corresponding subset of instructions of the first and second instruction threads. In one embodiment, using an embedded processor, the instruction cache 130 is coupled to the tightly coupled memory 120 and may operate as an L2 cache. In an alternative embodiment, the tightly coupled memory 120 is merely a subset of the instruction cache 130 and the data cache 140.

Similarly, the data cache 140 may store data associated with a thread. In various embodiments, the instruction cache 130 and data cache 140 may be dynamically allocated. Moreover, in contrast to the illustrated configuration, one embodiment enables the instruction cache 130 and data cache 140 to be co-located in the same cache.

In one embodiment, upon determining that a cache miss has occurred for either the instruction cache 130 or the data cache 140, the processing core 110 is configured to allow a second thread to use the processing core 110 while a first thread waits for data to be retrieved from a remote memory location, such as storage 170. Thus, if an instruction thread needs data from either, for example, the instruction cache 130 or the data cache 140 before executing a further instruction, rather than have the processing core 110 remain idle while the first instruction thread waits for data, another instruction thread may use the processing core 110 to execute an instruction. This may occur for a single or multiple execution cycles until the original instruction thread receives the data.

A scheduler 150 controls the successive fetching and issuing of instructions by the instruction dispatcher 113. More specifically, in at least one embodiment, the scheduler 150 outputs a thread selection signal to the instruction dispatcher 113 to control said instruction dispatcher's successive fetching and issuing of instructions. In one embodiment, the scheduler 150 outputs an execution thread selection signal to select circuitry 184 in the instruction dispatcher 113 to control successive retrieval and issuing of instructions by the instruction dispatcher 113. In one embodiment, the instruction dispatcher 113 is adapted to fetch and issue at least one instruction from an instruction cache 130 for a selected one of the first and second instruction execution threads each time the instruction dispatcher 113 is signaled by the scheduler 150 to fetch instructions for the selected one of the first and second instruction execution threads.

In one embodiment, the scheduler 150 also determines the execution cycle allocation for the instruction execution period for each of the plurality of instruction execution threads. In a further feature of at least one embodiment of the invention, the scheduler 150 allocates one or more execution cycles of the instruction execution period to each of the plurality of instruction execution threads.

In one embodiment, the scheduler 150 controls successive fetching and issuing of instructions by the instruction dispatcher 113, based at least in part on corresponding contiguous execution clock cycle allocations of each thread. Thus, the scheduler 150 enables each instruction execution thread having at least one remaining allocated execution cycle of the instruction execution period to fetch and issue another instruction via the instruction dispatcher 113.

Figure 6:
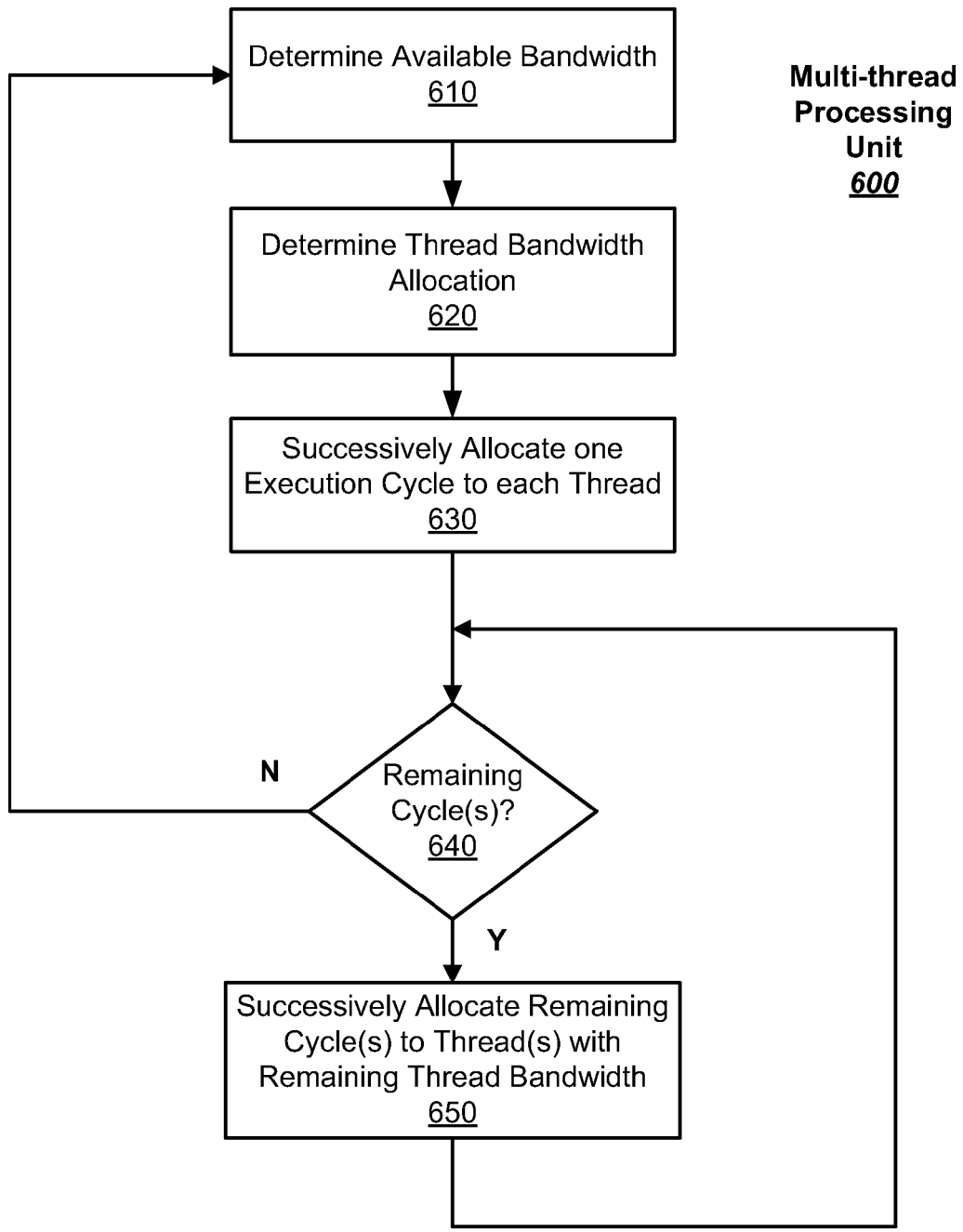
FIG. 6 illustrates a flow diagram view of a portion of the operations associated with allocation of execution cycles based on thread bandwidth of a multi-thread device as presented in FIG. 1 in accordance with at least one embodiment.
Figure 8:
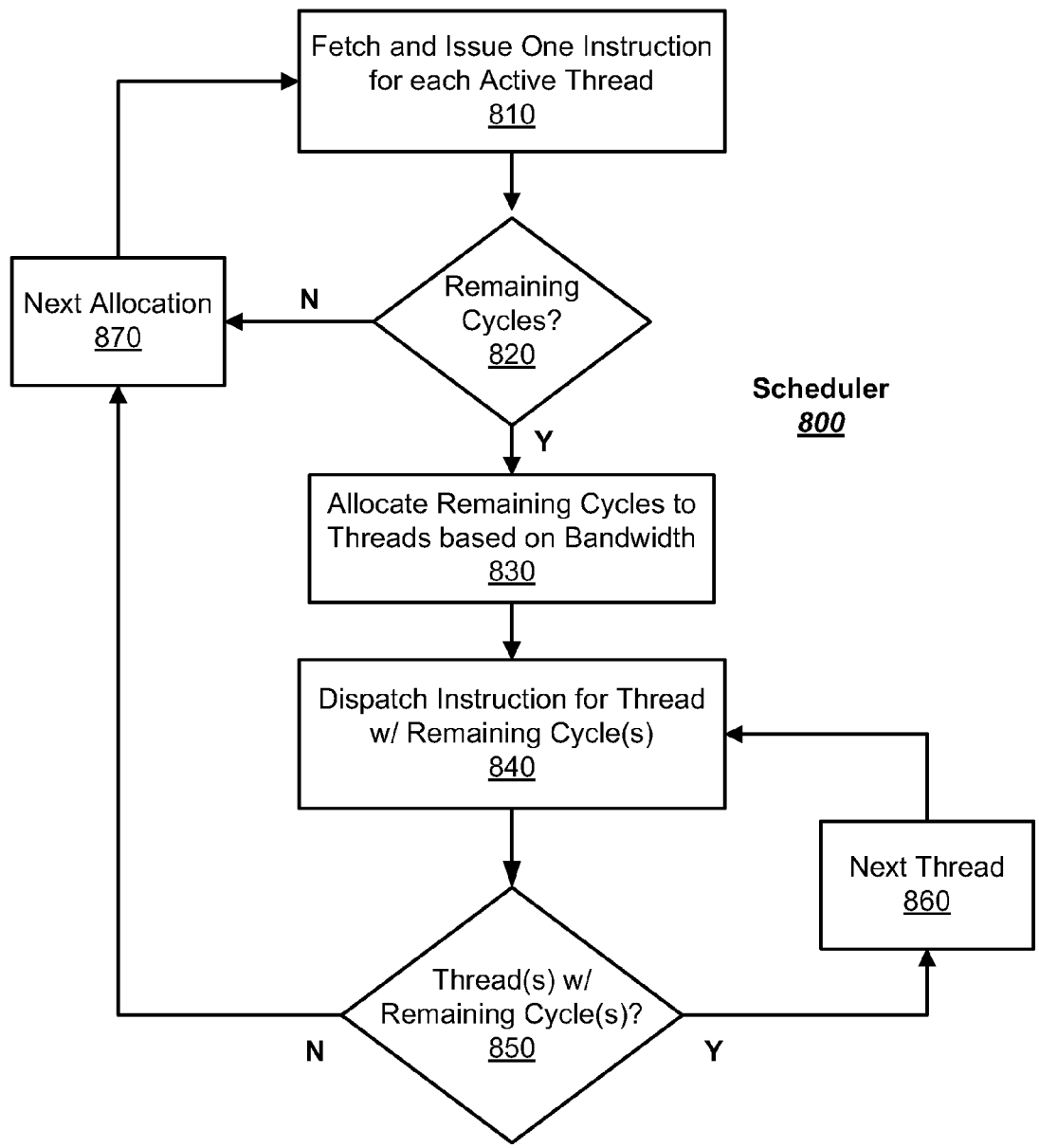
FIG. 8 illustrates a flow diagram view of a portion of the operations associated with a scheduler of a multi-thread device as presented in FIG. 1 in further detail, in accordance with various embodiments.

Embodiments illustrating a portion of the operations associated with the scheduler 150 are presented in FIG. 6 and FIG. 8 in further detail. In alternate embodiments, the present invention may be practiced with other schedulers.

Storage 170 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, memory 170 may comprise other and/or later-developed types of computer-readable memory including electrical, optical, acoustical or other form of propagated signals (e.g., carrier waves, infrared signals, digital signals). Machine-readable firmware program instructions may be stored in memory 170. In one embodiment, the storage 170 includes any storage medium or machine-accessible medium and/or any storage mechanism that provides (i.e., stores and/or transmits) information in a form readable by a machine (e.g., a computer).

Figure 2:
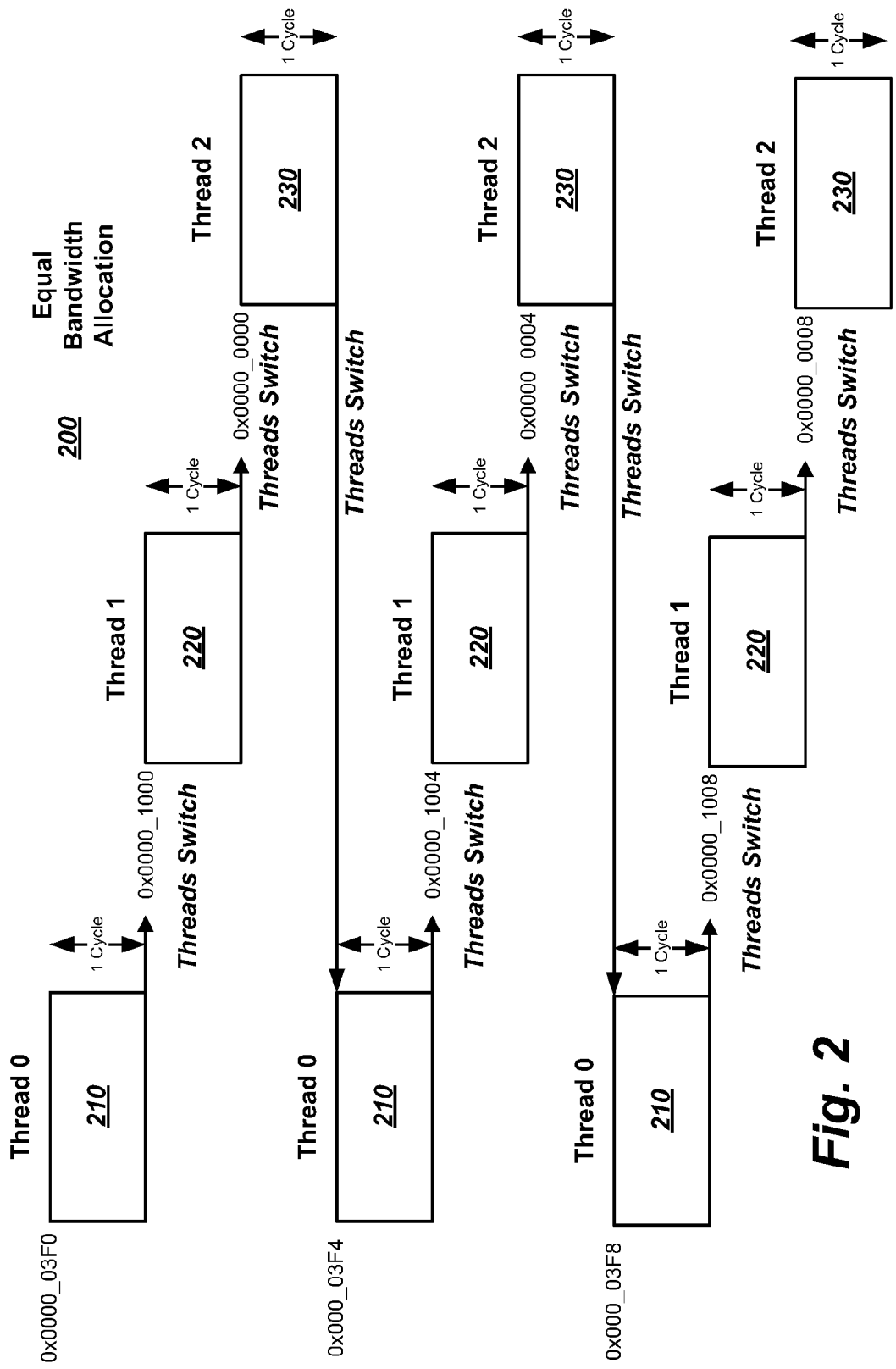
FIG. 2 illustrates threads switching on a multi-thread processor with equal bandwidth allocation for each thread in accordance with various embodiments.

Referring now to FIG. 2, threads switching on a multi-thread processor 200 with equal bandwidth allocation for each thread are shown in accordance with various embodiments. In the illustrated example, instructions from three threads (Thread 0, Thread 1, and Thread 2) are separated into multiple execution blocks of equal length for processing by multi-thread processor 200. A first execution block 210, a second execution block 220, and a third execution block 230 are each 1 cycle in length. The instructions are dispatched according to a distributed round robin scheduling scheme as described below and further herein in conjunction with FIG. 4.

The first execution block 210 draws an instruction from Thread 0 beginning with the instruction found at 0x0000_03F0. Once the multi-thread processor 200 changes from Thread 0 to Thread 1, the instruction of the second execution block 220 for Thread 1 beginning at 0x0000_1000 is processed. When the multi-thread processor 200 switches from Thread 1 to Thread 2, the instruction of the third execution block 230 for Thread 2 beginning at 0x0000_0000 is processed.

Upon switching back to Thread 0, the multi-thread processor 200 continues with the next instruction of the first execution block 210 at 0x0000_03F4. Upon switching to Thread 1, the multi-thread processor 200 continues with the next instruction of the second execution block 220 at 0x0000_1004. Upon switching to Thread 2, the multi-thread processor 200 continues with the next instruction of the second execution block 220 at 0x0000_0004. Subsequently, the multi-thread processor 200 will dispatch the instructions at 0x0000_03F4 for Thread 0, 0x0000_1008 for Thread 1, and 0x0000_0008 for Thread 2. Those skilled in the art will understand that the above example is not limited to 3 threads.

Figure 4:
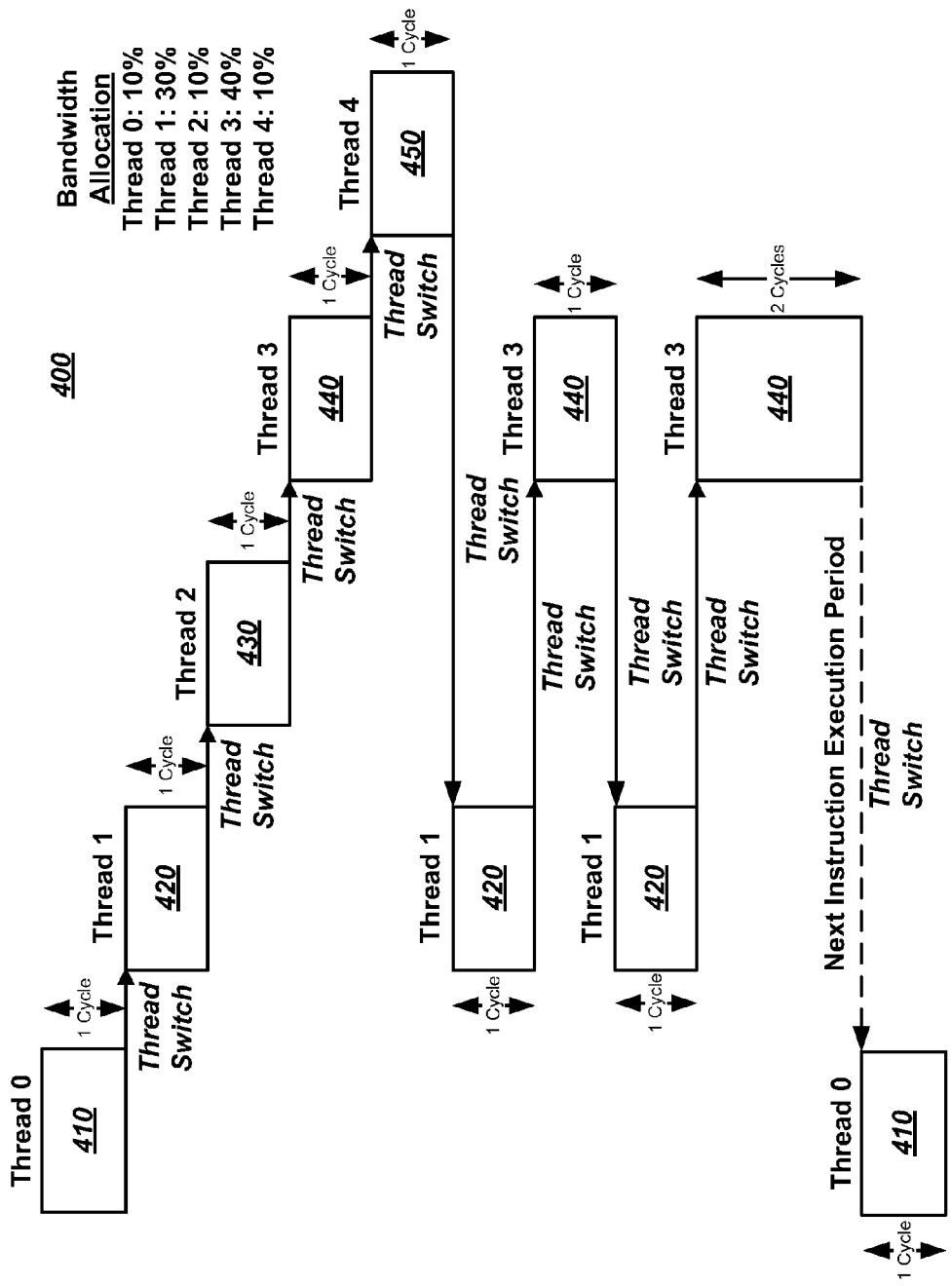
FIG. 4 illustrates threads switching on a multi-thread processor with dynamic bandwidth allocation for each thread, in accordance with various embodiments.

In contrast to the equal bandwidth allocation one embodiment, as presented in FIG. 4, one may customize length of each execution block and thread allocation according to various factors including the relative priority of the threads.

Referring now to FIG. 3, a chronological processing stage progression 300 following a thread switch with equal bandwidth allocation as presented in FIG. 2 is shown in accordance with various embodiments. The progression 300 assumes a six stage pipeline having an instruction fetch (IF) stage 310, an instruction decode (ID) stage 320, an instruction issue (IS) stage 330, an execution (EX) stage 340, a memory access (MEM) stage 350 and a write back (WB) stage 360, and an instruction execution period having nine clock cycles (Cycle 1-Cycle 9). The progression 300 further assumes three concurrently executed threads (T0, T1, and T2) with equal execution bandwidth requirements, in accordance with various embodiments. The progression 300 shows a new instruction from a new thread provided to the first stage each cycle. In this manner, the multi-thread processor is able to provide switching between the various threads. As previously noted, alternative embodiments may exhibit different processor configurations with different stage types and/or different numbers of stages based on the design and intended functionality of the multi-thread processor.

Referring now to FIG. 4, threads 400 switching on a multi-thread processor with dynamic bandwidth allocation for each thread are shown in accordance with various embodiments. In the illustrated example, instructions from five threads (Thread 0, Thread 1, Thread 2, Thread 3, and Thread 4) are separated into multiple execution blocks of variable length for processing by multi-thread processor 400. A first execution block 410 is one cycle in length, a second execution block 420 is three cycles in length, a third execution block 430 is one cycle in length, a fourth execution block 440 is four cycles in length, and a fifth execution block 450 is one cycle in length. Thus, in this example, the instruction execution period is defined as 10 execution cycles. The instructions are successively dispatched according to a weighted distributed round robin scheduling scheme as illustrated.

In accordance with various embodiments of the multi-thread processing environment 100 shown in FIG. 1, the multi-thread processor 400 includes dynamic bandwidth allocation for each thread. For each instruction execution period, the multi-thread processor 400 may dynamically change the processing bandwidth and/or number of cycles allocated to each thread. In this manner, the system may dynamically adjust access and usage of available processing resources based in part on the priority and/or activity of the various threads requesting execution during an instruction execution period.

It can be seen from the illustration, for this example, instructions were interleavingly dispatched for the five threads (T0-T4). Instructions of T3, having the biggest execution bandwidth requirement, are fetched and dispatched four out of the ten clock cycles, whereas instructions of T1 are dispatched three times during the ten clock cycle instruction thread execution period. T0, T2, and T4 having lower execution bandwidth requirements are dispatched once during the ten clock cycle instruction thread execution period.

Referring now to FIG. 5, a chronological processing stage progression following multiple thread switches with dynamic bandwidth allocation as presented in FIG. 4 is shown in accordance with various embodiments. The progression 500 assumes a six stage pipeline having an instruction fetch (IF) stage 510, an instruction decode (ID) stage 520, an instruction issue (IS) stage 530, an execution (EX) stage 540, a memory access (MEM) stage 550 and a write back (WB) stage 560, and an instruction thread execution period having ten clock cycles (Cycle 1-Cycle 10). The progression 500 further assumes five concurrently executed threads (T0, T1, T2, T3, and T4) with different execution bandwidth requirements. More specifically, for the illustrated instruction thread execution period, T3 having the largest execution bandwidth requirement (40% as shown in FIG. 4), followed by T1 (30% as shown in FIG. 4), which is followed by T0, T2, and T4 (each at 10% as shown in FIG. 4). The progression 500 shows a new instruction from a new thread having remaining allocated execution cycles provided to the first stage each cycle of the ten-cycle instruction execution period. In this manner, the multi-thread processor is able to provide switching between the various threads so long as the thread has remaining allocated execution cycles. As previously noted, alternative embodiments may exhibit different processor configurations with different stage types and/or different numbers of stages based on the design and intended functionality of the multi-thread processor.

It can be seen from the illustration, for this example, instructions were interleavingly dispatched for the five threads (T0-T4). Instructions of T3, having the biggest execution bandwidth requirement, are fetched and dispatched four out of the ten clock cycles, whereas instructions of T1 are fetched and dispatched three out of the ten clock cycles. T0, T2, and T4 each have lower execution bandwidth requirements and are each only fetched and dispatched one clock cycle during the ten clock cycle instruction thread execution period. The fetching and dispatching patterns continues until execution of at least one of the threads is completed or the execution bandwidth requirement of one of the threads changes.

Turning now to FIGS. 6-9, methods, in accordance with various embodiments, are described in terms of computer firmware, software, and hardware with reference to a series of flow diagrams. In various embodiments, portions of the methods to be performed by a processing device may constitute state machines or computer programs made up of computer-executable instructions. These instructions are typically maintained in a storage medium accessible by the processing device.

Describing the methods by reference to a flow diagram enables one skilled in the art to develop such programs including such instructions to carry out the methods on suitably configured processing devices, such as a multithread processor of a computing device executing the instruction execution threads from machine-accessible media). The computer-executable instructions may be written in a computer programming language or may be embodied in firmware logic. If written in a programming language conforming to a recognized standard, such instructions can be executed on a variety of hardware platforms and for interface to a variety of operating systems, such as multithread aware and non-multithread operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application . . . ), as taking an action or causing a result. Such expressions are merely a shorthand way of saying that execution of the software by a network device causes the processor of the computer to perform an action or a produce a result.

Referring now to FIG. 6, a flow diagram view of a portion of the operations associated with allocation of execution cycles based on thread bandwidth of a multi-thread device 600 as presented in FIG. 1 is shown in further detail in accordance with at least one embodiment. The multi-thread processing unit 600 determines the available processing bandwidth in block 610. In block 620, the multi-thread processing unit 600 allocates bandwidth to each thread. Upon determining the thread bandwidth allocation for each thread, the multi-thread processing unit 600 successively allocates one execution cycle from an instruction execution period to each thread in block 630.

In query block 640, the multi-thread processing unit 600 determines whether there are any remaining allocated execution cycles in the instruction execution period. If there are remaining unallocated execution cycles, the multi-thread processing unit 600 successively allocates the remaining execution cycles to the threads with remaining thread bandwidth in block 650. Otherwise, when there are no remaining execution cycles in a given instruction execution period, the processing unit 600 returns to block 610 to determine available bandwidth for the next instruction execution period. For example, if an instruction execution thread is defined as having 6 execution cycles and there are three threads and each thread is allocated an equal bandwidth of two execution cycles, then the multi-thread processing unit 600 will successively allocate an execution cycle to each thread until each thread has had 2 execution cycles during the instruction execution period. While in some embodiments, this may be done in a round robin scheme, it may be done in other ways as desired. In accordance with some embodiments, the allocation may be done such that if a thread is waiting for data, it may be skipped and returned to later during the instruction execution period.

Figure 7:
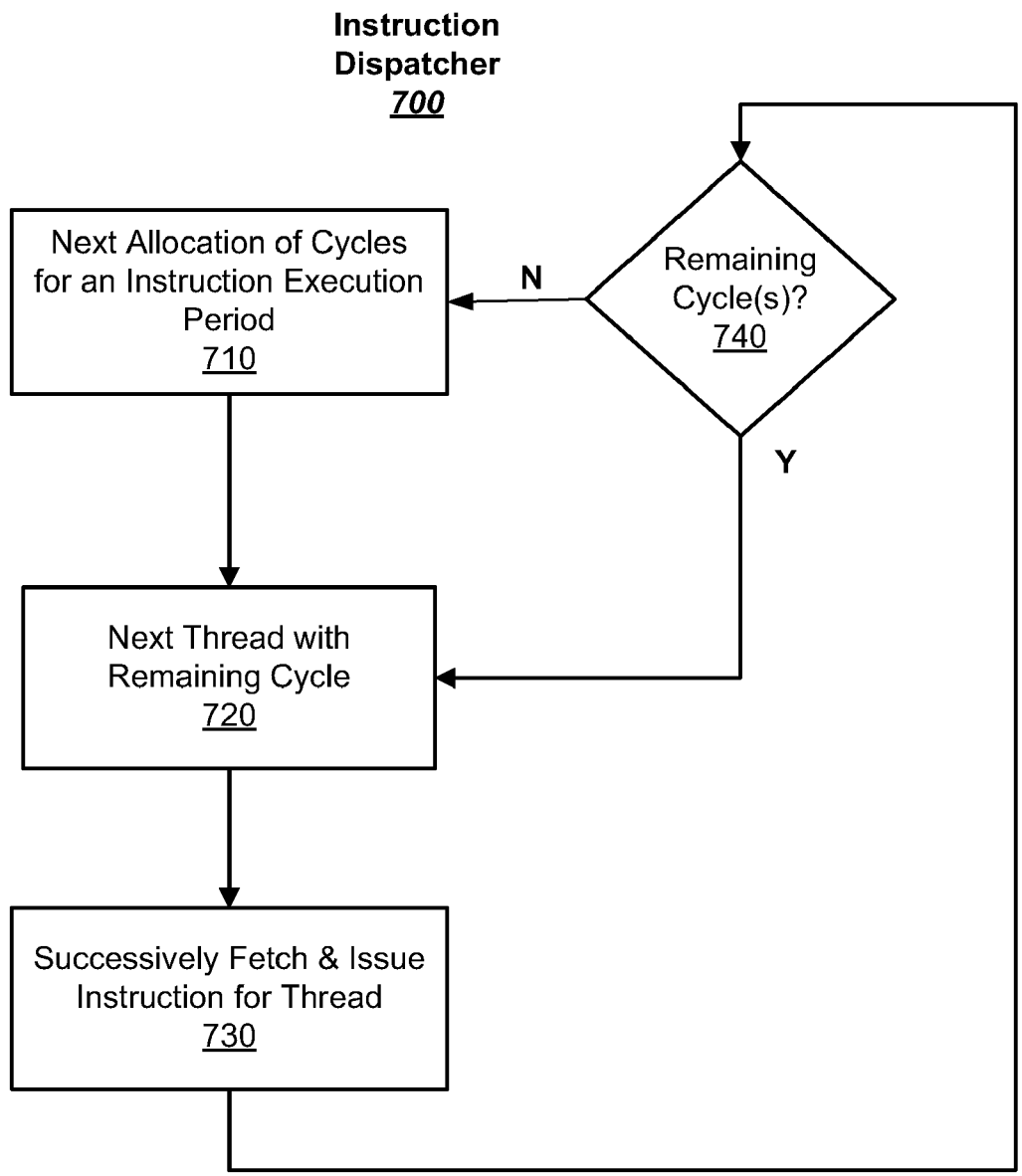
FIG. 7 illustrates a flow diagram view of a portion of the operations associated with instruction dispatch of a multi-thread device as presented in FIG. 1 in accordance with at least one embodiment.

Referring now to FIG. 7, a flow diagram view of a portion of the operations associated with an instruction dispatcher 700 as presented in FIG. 1 is shown in further detail in accordance with at least one embodiment. Initially, the instruction dispatcher 700 obtains the next allocation of cycles for an instruction execution period in block 710. The instruction dispatcher 700 selects the next thread with remaining cycles in block 720 and successively fetches and issues at least one instruction for the thread in block 730.

Subsequently, in query block 740, the instruction dispatcher 700 determines if there are any remaining execution cycles in the instruction execution period. If the execution cycles have been exhausted, the instruction dispatcher 700 obtains the next allocation of cycles for the next instruction execution period in block 710. If at least one remaining execution cycle still exists in the current instruction execution period, the instruction dispatcher 700 returns to block 720 and selects the next thread with a remaining execution cycle.

Referring now to FIG. 8, a flow diagram view of a portion of the operations associated with a scheduler 800 as presented in FIG. 1 is shown in further detail in accordance with various embodiments. The scheduler 800 fetches and issues one instruction for each active thread in block 810. For purposes of this description, an active thread is considered a thread requesting execution cycles during an instruction execution period. In query block 820, the scheduler 800 determines whether there are any remaining execution cycles to be allocated in an instruction execution period. If no execution cycles remain, the scheduler 800 obtains the next allocation of execution cycles for the next instruction execution period in block 870. Otherwise, when execution cycles remain, the scheduler 800 allocates the remaining execution cycles to active threads based on available bandwidth in block 830. The scheduler 800, in block 840, dispatches an instruction for a thread with a remaining execution cycle.

In query block 850, the scheduler 800 determines whether any active thread has at least one remaining allocated execution cycle. If allocated execution cycles still exist, the scheduler 800 selects the next active thread with allocated execution cycles in block 860. Otherwise, the scheduler 800 retrieves the next allocation of execution cycles for the next instruction execution period in block 870.

Figure 9:
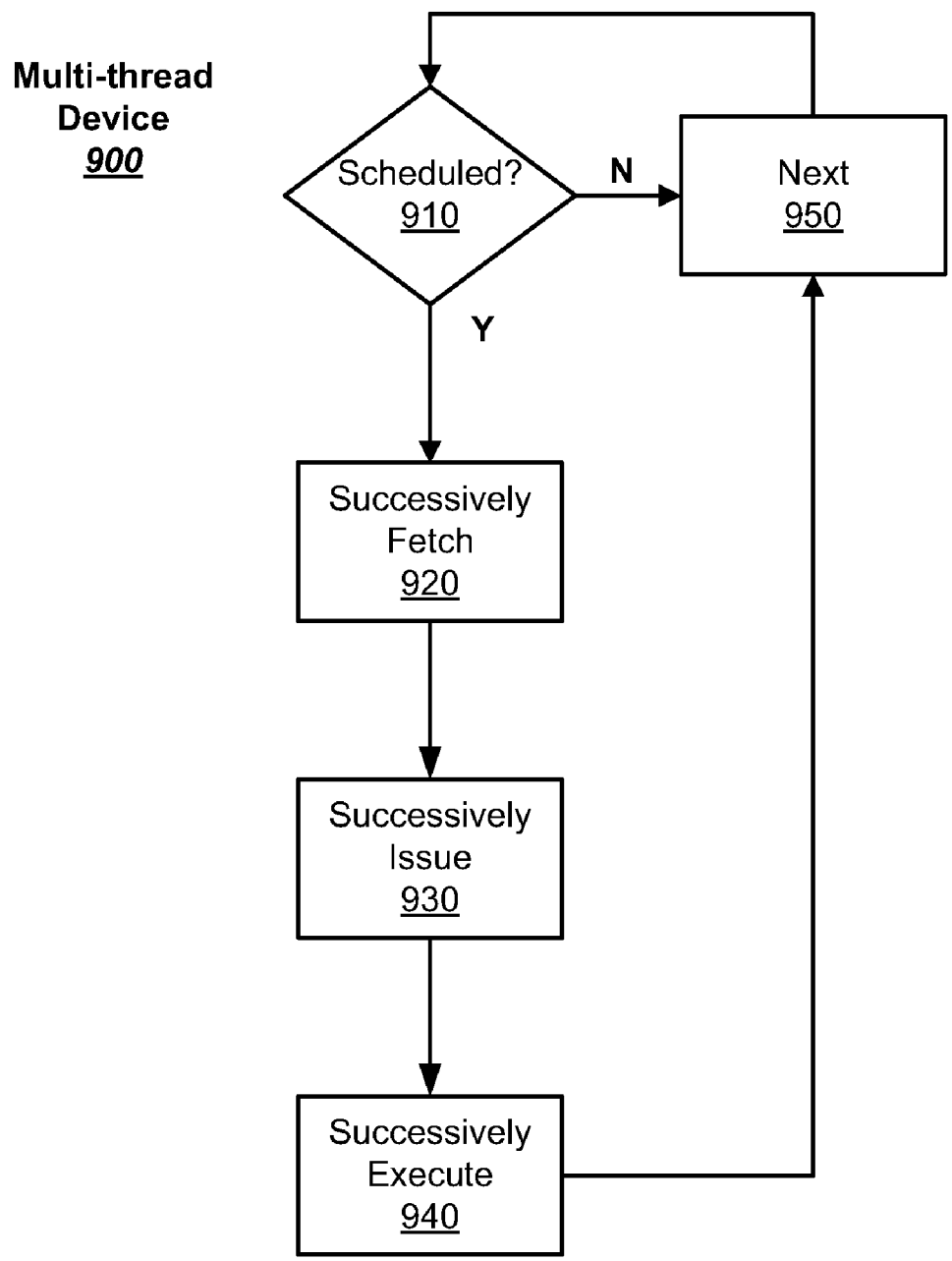
FIG. 9 illustrates a flow diagram view of a portion of the operations associated with instruction dispatch and execution by a multi-thread device as presented in FIG. 1 in further detail, in accordance with various embodiments.

Referring now to FIG. 9, a flow diagram view of a portion of the operations associated with instruction dispatch and execution by a multi-thread device 900 as presented in FIG. 1 is shown in further detail in accordance with various embodiments. As illustrated in block 910, the scheduler 150 of the multi-thread device 900 determines whether a thread has at least one remaining execution cycle for the instruction execution period. If there are no remaining execution cycles, the scheduler 150 of the multi-thread device 900 allocates the bandwidth for the next instruction execution period in block 950.

Otherwise, if the thread has at least one remaining execution cycle, the instruction dispatcher 113 of the multi-thread device 900 successively fetches the next instruction for the thread in block 920 and successively issues the next instruction for the thread to the execution circuitry 115 of the multi-thread device 900 in block 930. The execution circuitry 115 of the multi-thread device 900 executes the instruction in block 940. Subsequently, the multi-thread device 900 switches to the next thread in block 950. In one embodiment, the scheduler 150 of the multi-thread device 900 selects the next thread with remaining execution cycles in blocks 950 and query block 910.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof.

What is claimed is:

1. An instruction dispatching method, comprising:
a scheduler, of a multithread processing unit, successively allocating, M number of execution cycles to N number of instruction execution threads such that each of the N number of instruction execution threads is allocated equal number of execution cycles of the M number of execution cycles, wherein N is an integer, and wherein M is an integer and a multiple of N;
subsequent to successively allocating the M number of execution cycles, the scheduler determining that B number of execution cycles in a current instruction execution period is unallocated, where B is an integer;
in response to said determining, the scheduler successively allocating the B number of execution cycles to one or more of the N number of instruction execution threads based at least in part on bandwidth requirements of the individual instruction execution threads of the N number of instruction execution threads, wherein individual instruction execution threads of the N number of instruction execution threads are allocated unequal number of execution cycles of the B number of execution cycles, wherein the current instruction execution period includes the M number of execution cycles and the B number of execution cycles; and a dispatcher, of the multithread processing unit, successively issuing an instruction for a respective instruction execution thread of the plurality of instruction execution threads based at least in part on (i) successively allocating the M number of execution cycles and (ii) the B number of execution cycles to the plurality of instruction execution threads.

2. The method of claim 1, wherein the successively issuing includes sequentially retrieving and issuing a next instruction for each instruction execution thread.

3. The method of claim 1, wherein the successive allocating of instructions is based upon a weighted round robin scheme.

4. An apparatus comprising:

an execution block configured to execute instructions;

a scheduler coupled to the execution block, wherein the scheduler is configured to successively allocate M number of execution cycles to N number of instruction execution threads such that each of the N number of instruction execution threads is allocated equal number of execution cycles of the M number of execution cycles, wherein N is an integer, and wherein M is an integer and a multiple of N, subsequent to successively allocating the M number of execution cycles, determine that B number of execution cycles in a current instruction execution period is unallocated, where B is an integer, and in response to said determining, successively allocate the B number of execution cycles to one or more of the N number of instruction execution threads based at least in part on bandwidth requirements of the individual instruction execution threads of the N number of instruction execution threads, wherein individual instruction execution threads of the N number of instruction execution threads are allocated unequal number of execution cycles of the B number of execution cycles, wherein the current instruction execution period includes the M number of execution cycles and the B number of execution cycles; and an instruction dispatch block coupled to the scheduler, wherein the instruction dispatch block is configured to successively issue an instruction for a respective instruction execution thread of the plurality of instruction execution threads based at least in part on (i) successively allocating the M number of execution cycles and (ii) the B number of execution cycles to the plurality of instruction execution threads.

5. The apparatus of claim 4, wherein the instruction dispatch block is further configured to sequentially retrieve and issue a next instruction for each instruction execution thread.

6. The apparatus of claim 4, wherein the scheduler is further configured to control the instruction dispatch block to successively issue instructions via a weighted round robin scheme by outputting a thread selection signal to said instruction dispatch block.

7. The apparatus of claim 4, wherein the scheduler is further configured to skip an instruction execution thread when that thread is waiting for data.

8. The apparatus of claim 4, wherein the scheduler is further configured to determine available processing bandwidth to facilitate successive allocation of the B number of execution cycles.

9. The apparatus of claim 4, wherein the scheduler is further configured to control the successive issuing of instructions by said instruction dispatch block, based at least in part on corresponding contiguous execution cycles of the instruction execution period allocations of the instruction execution threads.

10. The apparatus of claim 4, wherein the instruction dispatch block is adapted to sequentially retrieve and issue a next instruction for each instruction execution thread having remaining allocated execution cycles each time the instruction dispatch block is signaled by the scheduler to dispatch instructions for the selected one of the plurality of instruction execution threads.

11. The apparatus of claim 4, wherein the apparatus is a processor.

12. The apparatus of claim 4, wherein the apparatus is an embedded processor.

13. The apparatus of claim 4, wherein the apparatus is an integrated circuit.

14. The apparatus of claim 4, wherein the apparatus is a processor.

15. The apparatus of claim 4, wherein the apparatus is an embedded processor.

* * * * *